United States Patent
Kroener et al.

(10) Patent No.: US 10,648,130 B2
(45) Date of Patent: May 12, 2020

(54) PROCESS FOR THE PRODUCTION OF A MICROFIBRILLATED CELLULOSE COMPOSITION

(71) Applicant: SOLENIS TECHNOLOGIES, L.P., Wilmington, DE (US)

(72) Inventors: Hubertus Kroener, Neustadt (DE); Paul Achatz, Mannheim (DE); Philipp Kloke, Mannheim (DE)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 804 days.

(21) Appl. No.: 14/899,820

(22) PCT Filed: May 27, 2014

(86) PCT No.: PCT/EP2014/060958
§ 371 (c)(1),
(2) Date: Dec. 18, 2015

(87) PCT Pub. No.: WO2014/202354
PCT Pub. Date: Dec. 24, 2014

(65) Prior Publication Data
US 2016/0145805 A1    May 26, 2016

(30) Foreign Application Priority Data
Jun. 20, 2013 (EP) .................................. 13173027

(51) Int. Cl.
| | |
|---|---|
| *D21C 9/00* | (2006.01) |
| *D21H 21/36* | (2006.01) |
| *C08B 15/08* | (2006.01) |
| *D21H 11/18* | (2006.01) |
| *D21B 1/08* | (2006.01) |
| *D21B 1/06* | (2006.01) |

(52) U.S. Cl.
CPC .............. *D21C 9/001* (2013.01); *C08B 15/08* (2013.01); *D21B 1/066* (2013.01); *D21B 1/08* (2013.01); *D21C 9/005* (2013.01); *D21C 9/007* (2013.01); *D21H 11/18* (2013.01); *D21H 21/36* (2013.01)

(58) Field of Classification Search
CPC .......... D21B 1/08; D21C 9/007; D21C 9/005; D21C 9/002; D21C 9/001
See application file for complete search history.

(56) References Cited

U.S. PATENT DOCUMENTS

| | | | |
|---|---|---|---|
| 6,103,294 A * | 8/2000 | Bendiner .............. | A23L 3/3472 426/138 |
| 2012/0214979 A1 | 8/2012 | Heiskanen et al. | |
| 2014/0284011 A1* | 9/2014 | Krapsch .................. | D21C 5/02 162/168.3 |

FOREIGN PATENT DOCUMENTS

| | | |
|---|---|---|
| WO | WO 00/47628 A2 | 8/2000 |
| WO | WO 01/66600 A1 | 9/2001 |
| WO | WO 2006/048280 A1 | 5/2006 |
| WO | WO 2010/149711 A2 | 12/2010 |
| WO | WO 2011/051882 A1 | 5/2011 |
| WO | WO 2012/007363 A1 | 1/2012 |

OTHER PUBLICATIONS

Khokhar et al., Comparitive Studies on the Amylase and Cellulase Production of Aspergillus and Penicillium,2012, J. Appl. Sci. Environ. Manage., vol. 15 (4), 657-661.*
International Search Report dated Oct. 8, 2014 in PCT/EP2014/060958.

* cited by examiner

*Primary Examiner* — Anthony Calandra
(74) *Attorney, Agent, or Firm* — Lorenz & Kopf, LLP

(57) ABSTRACT

The present invention relates to a process for the production of microfibrillated cellulose composition, wherein the microfibrillated cellulose has an average fiber length in the range from 500 to 1300 μm and a percentage of fiber length in the category ≤200 μm of at least 15%, obtained by subjecting an aqueous mixture comprising 30 to 70% by weight of cellulose containing fibers to mechanical shearing at a temperature in the range of from ≥40° C. to ≤120° C. in the presence of at least one thermostable biocide, to the microfibrillated cellulose composition obtained in this process and their use in a process for production of paper, card and board comprising draining a paper stock comprising the microfibrillated cellulose composition with sheet formation in the wire.

12 Claims, No Drawings

PROCESS FOR THE PRODUCTION OF A MICROFIBRILLATED CELLULOSE COMPOSITION

DESCRIPTION

The present invention relates to a process for the production of microfibrillated cellulose composition, wherein the microfibrillated cellulose has an average fiber length in the range from 500 to 1300 μm and a percentage of fiber length in the category ≤200 μm of at least 15%, obtained by subjecting an aqueous mixture comprising 30 to 70% by weight of cellulose containing fibers to mechanical shearing at a temperature in the range of from ≥40° C. to ≤120° C. in the presence of at least one thermostable biocide. It further relates to a process for production of paper, card and board comprising draining a paper stock comprising the microfibrillated cellulose composition with sheet formation in the wire.

In the paper making process, especially since it is a process with circulating water, biodegradation and contamination by microorganisms are a well-known problem. In general they are solved by the addition of a biocide at some point of the internal water circulation. Besides sizing agents, wet strength agents, retention aids, drainage aids, optical brighteners, defoamers and paper dyes, biocides are typical additives used in the papermaking process.

The development of novel processes for production of paper takes place at various points in the process. Improved papers are obtained through novel feedstocks or otherwise modified dosing processes. A new development is the use of microfibrillated cellulose as a paper additive for strength. A wide variety of material is understood under expressions like microfibrillated cellulose, nanocellulose or defibrillated cellulose.

A common understanding is that microfibrillated cellulose is a cellulose which is defibrillated, which means that the individual microfibrils of a cellulose containing fiber have been partly or totally detached from each other.

One method to produce defibrillated cellulose fibers is a mechanical treatment of cellulose in a twin screw extruder as described in WO 2010/149711. The microfibrillated cellulose of this process is used to produce 3-dimensional objects which have a high density of at least 850 kg/m$^3$. Beside this main aspect papers are mentioned.

WO 2011/051882 describes the process of manufacturing microfibrillated cellulose with the aid of an extruder. In this process modifying chemicals are added, which modify the he surface of the fibers and aid the defibrillation process. Further modifying chemicals are oxidizing compounds like hydrogen peroxide, sodium hypochlorite or ammonium persulfate. Since these oxidizing compounds also react very fast with the microfibrillated cellulose and are quickly consumed in the process, they are not suitable in terms of long time stabilisation of the microfibrillated cellulose.

Also other chemical pretreatment methods are known, such as an oxidation pretreatment of pulp fibers described by Saito et al. in Biomacromolecules, Vol. 8, No. 8, 2007, pp. 2485-2491. The pulp fibers are oxidized with a 2,2,6,6-tetramethylpiperidine-1-oxyl radical (TEMPO)-mediated system followed by mechanical treatment. This oxidation pretreatment converts primary hydroxyl groups of the celluloses to carboxylate groups. The produced nanofibers typically have a width of about 3-4 nm and a length of a few μm.

WO 2006048280 describes fibers whereby additives are coated or attached onto the surface of cellulose fibers. Because the additives are bound to the cellulose fiber, they remain clinging to the fibers to a substantial degree even in aqueous suspensions. These treated fibers serve as a substrate for traditional paper-making additives, in order to enhance the effectiveness of the additives, reduce their consumption, and decrease the CSB load in the waste water. Among others, biocides are mentioned as additives without given any further teaching.

WO 2001066600 (Hercules) describes a derivatized microfibrillar cellulose comprises a substituent having cationic charge, as for example by the presence of amine groups. Preferably the derivatizing step involves derivatizing the cellulose with a quaternary amine reagent, such that the derivatized microfibrillar cellulose includes quaternary amine functionalized cellulose. This derivatization is the result of the two step process. In a first step the fibers of a pulp slurry with fiber length of 400 μm is modified with 3-chloro-2-hydroxypropyl trimethylammonium chloride. In the subsequent step the amine functionalized cellulose is diluted to a concentration below 1% and is than processed in a homogenizer in the presence of a biocide.

WO 2000047628 teaches a microfibrillar polysaccharide which is derivatized with substituents which provide electrostatic and/or steric functionality, particularly anionic charge. In a first step a polysaccharide is chemically modified and in the second process step the received product is highly diluted and processed in a homogenizer in the presence of a biocide.

Because of the high amount of defibrillation, microfibrillated cellulose exhibits a significantly larger surface than standard pulp and is significantly more susceptible towards degradation by microorganisms (like bacteria and fungi). This degradation process leads to a reduced usability and efficiency of the microfibrillated cellulose in the paper making process, as the contaminated microfibrillated cellulose is more difficult to disperse and tends to clog filters and sieves. Therefore it is an object of the present invention to enhance the stability of the microfibrillated cellulose. It is a further object of the present invention to provide stabilized microfibrillated cellulose capable of storage in moist form for extended periods of time without experiencing microbiological degradation. The papers produced therewith should have strength properties. These strength properties include in particular the dry breaking length, the internal bonding strength and the stiffness of the paper.

We have found that this object is achieved by a process for the production of microfibrillated cellulose composition, in which the microfibrillated cellulose has an average fiber length in the range from 500 to 1300 μm and a percentage of fiber length in the category ≤200 μm of at least 15%, obtained by subjecting an aqueous mixture comprising 30 to 70% by weight of cellulose containing fibers to mechanical shearing at a temperature in the range of from ≥40° C. to ≤20° C. in the presence of at least one thermostable biocide. The present invention is further about the microfibrillated cellulose composition obtained in this process.

The present invention is further about a process for production of paper, card and board comprising adding the microfibrillated cellulose composition to the paper stock.

Preferred is a process for the production of microfibrillated cellulose composition, in which the microfibrillated cellulose has an average fiber length in the range from 500 to 1300 μm and at least 15% by weight of the fibers have a fiber length ≤200 μm, obtained by subjecting an aqueous mixture comprising 30 to 70% by weight of cellulose containing fibers to mechanical shearing at a temperature in the range of from ≥40° C. to ≤120° C. in the presence of at least one thermostable biocide.

Paper stock is herein below to be understood as referring to a mixture of water and fibrous material and further comprising, depending on the stage in the paper, card or board production process, the microfibrillated cellulose composition, optional filler and optionally paper auxiliaries.

The dry matter content of paper is to be understood as meaning the solids content of paper, card and fibrous material as determined using the oven-drying method of DIN EN ISO 638 DE.

In this document, microfibrillated cellulose (MFC) is understood as meaning cellulose forms in which the microfibrillated cellulose has an average fiber length in the range from 500 to 1300 μm and the percentage of length in the category <200 μm is at least 15%.

The average fiber length is understood in this document to be the weight-weighted average fiber length ($L_w$) determined according to Tappi standard T 271. The percentage of length in the category <200 μm is determined as described in Tappi standard T 271.

The starting material for the microfibrillated cellulose is cellulose containing fibers which can be virgin and/or recovered fibers. Fiber sources for use in this invention include the following: Any softwood or hardwood fiber typically used in the paper industry can be used, examples being mechanical pulp, bleached and unbleached chemical pulp and also fibrous materials from annual plants. Mechanical pulp includes for example groundwood, thermomechanical pulp (TMP), chemothermomechanical pulp (CTMP), pressure groundwood, semichemical pulp, high-yield pulp and refiner mechanical pulp (RMP). Sulfate, sulfite and soda chemical pulps can be used for example. Suitable annual plants for production of fibrous materials include for example rice, wheat, sugar cane and kenaf. Also, agricultural waste materials can be used as a starting material, e.g. oat husks or wheat straw. Pulps can also be produced using wastepaper, used alone or in admixture with other fibrous materials. The wastepaper can come from a de-inking process for example or old-corrugated container pulp (OCC). However, it is not necessary to subject the wastepaper to be used to such a process. It is further also possible to proceed from fibrous mixtures formed from a primary stock and recycled broke.

Preferred cellulose containing fibers as starting material are bleached chemical pulp, preferably bleached kraft pulp, preferably softwood kraft pulp, and/or wastepaper.

According to one embodiment of the invention the microfibrillated cellulose received is used in a process for production of paper. For this use of the microfibrillated cellulose such fibers are preferred as starting material which are of the same composition as the pulp composition of the paper.

The cellulose containing fibers as starting material may be pre-treated before being subjected to the method according to the invention. Such pre-treatment may include removal of toxic or unwanted materials, chopping, hammer milling or pinning of the material, washing, either singly or combinations thereof.

According to the invention the cellulose containing fibers as starting material are sheared mechanically as a mixture in water. Because of the high fiber concentration this mixture has the appearance of a moisturized pulp. The solid content of the fibrous mixture is from 30 to 70% by weight of the mixture, preferably 40 to 60% by weight, most preferably 50 to 60% by weight.

Mechanical shearing may occur with a single screw, twin screw or conical extruder or with a refiner. It is preferred to use a twin screw extruder.

Preferred is a twin screw extruder as described in WO 2010/149711 which teaching is incorporated by reference.

A preferred method for the treatment of cellulose containing fibers into a composition comprising microfibrillated cellulose is characterized in that the method comprises the steps of
a) Providing cellulose containing fibers;
b) Grinding said cellulose containing fibers to a suitable particle size;
c) Admixing aqueous solution/solvent to said cellulose containing fibers to provide a fiber mixture comprising cellulose containing fibers;
d) Feeding said fiber suspension comprising cellulose containing fibers into a shearing step comprising a mechanical defibrillation process executed using a twin screw extruder;
e) Shearing said fiber suspension with at least the use of said refining twin screw, to provide a composition comprising cellulose microfibers.

Step a) Suitable cellulose containing fibers are mentioned as starting materials above.

Step b) The cellulose containing fibers, for example softwood kraft pulp sheets, are ground to a particle size suitable for feeding into the shearing step. Grinding may be done for example with a cutting mill, a shredder or a granulator. The preferred particle size after the grinding step is in the range from 2 to 40 mm.

Step c) The cellulose containing fibers are (preferably while being subjected to the coarse grinding) mixed with an aqueous solution/solvent, such as tap water or deionised water. It is further possible to use water taken from the circuit of the paper machine. Said mixing can for example, be performed by dry feeding the cellulose containing fibers into a twin screw machine and adding water through dosing points along the twin screw machine. In one embodiment the treatment of the material as it passes along the twin screw machine is varied at different stages. In one embodiment the stages include the kneading of the material and another stage is provided to restrict the flow of the material. The mixing with the aqueous solution/solvent/liquid may be performed by any means known to the skilled person, however preferably, preparing the fiber mixture is achieved by feeding the cellulose containing fibers to a first twin screw that is fitted with a water (or steam) feed system, preferably a meter feed system. In the twin screw the liquid and the cellulose containing fibers are processed into a pulp. Preferably a counter rotating twin screw is applied in this step. In general, for the fiber treatment a co-rotating twin screw processing machine can be used at a speed of, for example, 250 RPM and in the range of 400-600 RPM and a set temperature of about 50[deg.], but this temperature can be varied according to the fibers being treated, depending on the liquid addition rate and necessity.

Steps d) and e): In a next step of the method according to the invention, the obtained cellulose containing fibers mixture is fed into a shearing step comprising a mechanical defibrillation process executed using a twin screw extruder and refining said mixture comprising cellulose containing fibers with at least the use of said twin screw extruder, to provide a composition comprising microfibrillated cellulose.

According to the invention the mixture comprising cellulose containing fibers is mechanically sheared in the presence of at least one thermostable biocide. The addition of the biocide can be before or during the shearing step e).

If it is added before the shearing step e), it is preferably added to the aqueous solution/solvent which is used to moisturize the starting material for the MFC. When the thermostable biocide is added during the step e), it is dosed via a displacement pump to an inlet in the first mixing zone of the screw extruder. Preferably the thermostable biocide is added during step c).

The shearing of the cellulose containing fibers is processed to a microfibrillated cellulose which has a freeness of ≥60 SR. Preference is given to a microfibrillated cellulose having a freeness of ≥75 SR, especially of ≥80 SR. There is no upper limit for the freeness of the microfibrillated cellulose in terms of the suitability but generally it is not higher than 90 SR.

The shearing of the cellulose containing fibers is performed until the microfibrillated cellulose has a BET surface area of 20 to 100 $m^2/g$. Preference is given to using fibrous material having a BET surface area of 30 to 60 $m^2/g$.

The mechanical shearing is performed with an energy input of 0.3 to 10 MWh/t, preferably of 2 to 5 MWh/t of dry fiber.

In general the temperature during the shearing process is in the range of from ≥40° C. to ≤120° C.

According to the present invention the shearing is in the presence of a thermostable biocide. Thermostable means more than 50% of the biocide remains active after the mechanical treatment.

Biocides are substances which control, i.e. kill or prevent the growth of microorganisms such as bacteria, fungi or algae.

The types of microorganisms encountered in the papermaking process are aerobic and anaerobic bacteria, fungi (e.g. yeasts and moulds) and their spores, as well as algae.

Examples of aerobic bacteria are *Bacillus subtitlis, Bacillus cereus, Bacillus megaterium, Bacillus mycoides, Achromobacter, Acinetobacter, Aeromonas, Beggiatoa, Citrobacter, corynebacterium, enterobacter, Escherichia, Flavobacterium, Gallionelle, Kebsiella, Lepthotrix, Micrococcus, Pseudomonas, Sphaerotilus, Staphylococcus* and *Thiobacillus*. In particular, bacterial species, such as *pseudomonas*, are found in the watersource.

Examples of anaerobic bacteria are *Clostridium, Desulfovibrio* and *Actinomycetes*.

Examples of yeasts include *Candida, Geotrichum, Monilia, Thodotorula, Saccharomyces* and *Torula*.

An example of a mould within the family Hypomycetes are *Aspergillus* and *Penicillium*. Further examples are *Alternaria, Fusarium, Phialophora, Phycomyces* and *Trichoderma*.

Examples of algae include, *Asterionella, Navicula, Oscillatoria* and *Chlorococcus*.

Preferred thermostable biocides are selected from the group consisting of 2H-isothiazol-3-one derivatives, glutaraldehyde, pyrithione and its derivatives, benzalkonium chloride. Examples of 2H-isothiazol-3-one derivatives are methylisothiazolinone, chloromethylisothiazolinone, octylisothiazolinone, and benzisothiazolinone. Examples of pyrithione derivatives are sodium pyrithione and dipyrithione.

Preferred thermostable biocides are selected from the group consisting of methylisothiazolinone, chloromethylisothiazolinone, octylisothiazolinone, benzisothiazolinone, glutaraldehyde, sodium pyrithione, benzalkonium chloride.

The invention furthermore relates to the use of microfibrillated cellulose composition described above in a process for the preparation of paper, card and board. According to a further aspect of the present invention a process is provided for the preparation of paper, card and board comprising adding to the paper stock the microfibrillated cellulose composition described above and optionally adding to the paper stock one or more papermaking additives, and then draining the paper stock on a moving screen to form a sheet, and then drying. The invention furthermore relates to the paper produced in this process.

The microfibrillated cellulose composition of the present invention is used in the production of filler containing paper, card and board. The process of the present invention is further used in the production of filler free paper, card and board. Specifically, these are filler-containing papers such as, for example, wood-free uncoated printing, writing or copying paper and wood-containing uncoated papers such as, for example, recycled newsprint or SC papers for the offset or gravure printing sector.

The fibers of the paper stock are treated according to the present invention by adding microfibrillated cellulose composition according to the invention to the paper stock at a fibrous concentration of the paper stock in the range from 20 to 40 g/l. A fibrous concentration of 20 to 40 g/l (corresponding to a fibrous concentration of 2 to 4 wt % based on the fibrous material) is typically what the thick stock in paper production has. Thick stock is distinguished from thin stock, hereinafter to be understood as meaning a fibrous concentration in the range from 5 to 15 g/l. Following the treatment with microfibrillated cellulose composition, the paper stock is diluted with water to a fibrous concentration in the range from 5 to 15 g/l.

The microfibrillated cellulose composition is preferably added in an amount of 0.1 to 10.00 wt %, based on the paper stock (solids). Preference is given to the addition of the microfibrillated cellulose in an amount of 1 to 7 wt % especially 3 to 6 wt %, based on the paper stock (solids).

The time during which the microfibrillated cellulose composition acts on a purely fibrous/paper stock material from addition to sheet formation is for example in the range from 0.5 seconds to 2 hours, preferably in the range from 15 seconds to 15 minutes and more preferably in the range from 30 seconds to 5 minutes.

In addition to the microfibrillated cellulose composition according to the invention, filler may be added to the fibrous material. Useful fillers include any typical paper industry pigments based on metal oxides, silicates and/or carbonates especially pigments from the group consisting of calcium carbonate, which can be used in the form of ground (GCC) lime, chalk, marble or precipitated calcium carbonate (PCC), talc, kaolin, bentonite, satin white, calcium sulfate, barium sulfate and titanium dioxide. Mixtures of two or more fillers can also be used.

The present invention utilizes inorganic fillers having an average particle size (Z-average) ≤10 μm, preferably in the range from 0.3 to 5 μm and especially in the range from 0.5 to 2 μm. Average particle size (Z-average) is generally determined herein for the inorganic filler and also the particles of the pulverulent composition by the method of quasi-elastic light scattering (DIN-ISO 13320-1) using a Mastersizer 2000 from Malvern Instruments Ltd.

In addition to the microfibrillated cellulose composition according to the invention, customary paper auxiliaries may optionally be added to the paper stock, generally at a fibrous concentration of 5 to 15 g/l. Conventional paper auxiliaries include for example sizing agents, wet strength agents, cationic or anionic retention aids based on synthetic polymers and also dual systems, drainage aids, other dry strength enhancers, optical brighteners, defoamers, biocides and paper dyes. These conventional paper additives can be used in the customary amounts.

Useful sizing agents include alkyl ketene dimers (AKDs), alkenylsuccinic anhydrides (ASAs) and rosin size.

Useful retention aids include for example anionic microparticles (colloidal silica, bentonite), anionic polyacrylamides, cationic polyacrylamides, cationic starch, cationic polyethyleneimine or cationic polyvinylamine. In addition, any desired combinations thereof are conceivable, for example dual systems consisting of a cationic polymer with an anionic microparticle or an anionic polymer with a cationic microparticle. To achieve high filler retention, it is advisable to add such retention aids as can be added for example to thin stock as well as to thick stock.

Dry strength enhancers are synthetic dry strength enhancers such as polyvinylamine, polyethyleneimine, glyoxylated polyacrylamide (gPAM) or natural dry strength enhancers such as starch.

The microfibrillated cellulose obtainable according to the present process shows superior performance in its application in a process for production of paper, card and board. The resulting paper, card and board show good tensile strength (ISO 1924-2), good z-directional strength (Tappi T 541), and good burst strength (ISO 2758 and ISO 2759) even if the microfibrillated cellulose was stored over week. They further have a good performance in the short-span compression test (SCT, ISO 9895) and the corrugated medium test (CMT, ISO 7263).

The examples which follow illustrate the invention. Percentages reported in the examples are by weight, unless stated otherwise.

MFC is made according to the process and equipment described in WO2010/149711, example 3 but with the addition of the biocid.

Twin Screw Configuration

The method according to the invention has been performed with a co-rotating intermeshing twin screw as the twin screw refining system. In this example, the barrel internal diameter was 24mm, the screw outer diameter (OD) was 23.6 mm, the screw internal diameter (ID) was 13.3 mm, the distance between the centre lines of the screws was 18.75 mm, the pitch is positive with respect to rotation-although negative elements can be used-and the screw design was of a bi-lobal type. The configuration of this twin screw is given in Table 1 in WO 2010/149711. The Table 1 gives the number and type of screw elements of each screw in successive order from the inlet side-upper side of the table—to the outlet side-lower side of table-of the screw. From this table it follows that the total L/D ratio of the screw is 40: 1 and that the diameter of each screw element is 23.6 mm and the diameter of the barrel is 24 mm. Table 1: Configuration of twin screw refining system The following MFC types were prepared:

TABLE 1

| | MFC types used: | | | | | |
|---|---|---|---|---|---|---|
| Sample Name | Fiber source (starting material) | Moisture content [%] | °SR-value | BET value [m²/g] | $L_w$ [µm] | $P_{l, \leq 200\ \mu m}$ [%] |
| MFA-A | Bleached eucalyptus pulp | 49.5 | 85 | 65 | 770 | 16.3 |
| MFC-B | Liner board from recycled paper and old corrugated carton | 48.3 | 90 | 59 | 800 | 18.8 |
| MFC-C | Oat husks | 49.7 | 15 | 72 | 650 | 22.1 |
| MFC-D | Hemp fibers | 50.0 | 87 | 55 | 930 | 19.6 |
| MFC-E | Wheat straw | 51.2 | 25 | 62 | 670 | 21.4 |

$L_w$: weight-weighted average fiber length determined according to Tappi standard T 271
$P_{l, <200\ \mu m}$: percentage of length in the category ≤200 µm Determination of the moisture content: The resulting MFC was dried in an oven at 120° C. until constant weight.

Determination of the ° SR-Value followed the procedure given in ISO 5267-1 using a Schopper-Riegler measurement device (Frank PTI).

Determination of specific surface area (BET value):

The specific surface area of the microfibrillated cellulose (BET value) is obtained by the following procedure: An aqueous microfibrillated cellulose formulation (suspension, gel) is placed on a frit and washed with tert-butanol. The resulting tert-butanol suspension of microfibrillated cellulose is then transferred from a frit to a pre-cooled metal plate (ca. 0° C.) having a glass cover (lyophilisator). The sample is dried under vacuum while cooling overnight. Tert-butanol sublimes slowly, leaving the microfibrillated cellulose structure lyophilized. The resulting sponge-like solid microfibrillated cellulose is analyzed by physisorption of nitrogen (measurement in a surface area BET analyzer (Micromeritics ASAP 2420); the $N_2$ load on the surface is plotted vs. the $N_2$ partial pressure and assessed by BET theory), leading to the surface area of the sample.

Description of the test method for bio contamination:

Samples of the MFC prepared according to table 1 were stored at room temperature in plastic bags. The samples were analyzed for their bio contamination according to the following procedure after one, two, four and eight weeks.

The MFC sample was dispersed in DI water to give a 4 wt % fiber dispersion using a high shear disperger (Ultraturrax RW28 with R1302 dissolver stirrer, Fa. IKA, 6000 rpm, 5 min, room temperature). 7.8 ml of the fiber suspension were evenly distributed on a round petri disc (100 mm diameter), filled 5 mm high with agar based culture medium. By the use of different media, aerobic bacteria, anaerobic and sulfate reducing bacteria, mould and yeast can be detected separately.

The spiked agars are stored in an incubator for a certain time. Then the number of colonies on the culture medium is evaluated visually with the help of a scale.

Bacteria growth rate
  0=no growth
  1=minimal growth; 1 to 10 colonies in entire culture
  2=light growth; max. 100 colonies
  3=medium growth; max. 300-400 colonies
  4=even growth; individual colonies still visible, >400 colonies
  5=strong growth; to many colonies to count, but still uncovered areas visible
  6=entire surface covered Fungi growth rate:
  0=no visible growth
  X=minimal growth
  XX=light growth XXX=medium growth
XXXX=strong growth
Results are given in table 2

TABLE 2

Microbiological testing of unstabilized MFC

| duration | Sample | MFC-A | MFC-B | MFC-C | MFC-D | MFC-E |
|---|---|---|---|---|---|---|
| 1 week | bacteria | 3 | 4 | 3 | 3 | 3 |
| 2 weeks | bacteria | 5 | 6 | 5 | 5 | 5 |
| 4 weeks | bacteria | 6 | 6 | 6 | 6 | 6 |
| 8 weeks | bacteria | 6 | 6 | 6 | 6 | 6 |
| 1 week | fungi | 0 | 0 | 0 | X | 0 |
| 2 weeks | fungi | X | XX | XX | XX | XX |
| 4 weeks | fungi | XXXX | XXXX | XXXX | XXXX | XXXX |
| 8 weeks | fungi | XXXX | XXXX | XXXX | XXXX | XXXX |

In the next step, the same MFC types were prepared, but a biocide was added before, during, or after the extrusion step. When the biocide was added before the extrusion step, it was added to the water which was used to moisturize the base material for the MFC. When the biocide was added during the extrusion step, it was dosed via a displacement pump to an inlet in the first mixing zone of the screw extruder. When the biocide was added after the extrusion step (these examples are for comparison), a sample of the MFC which was obtained after the extrusion step was placed in a lab blender and the biocide was added to the MFC material, followed by mechanical mixing of the materials for 5 min.

The material containing the biocide was then stored at room temperature in a plastic bag and analyzed for antimicrobial growth according to the procedure described above after 1, 4 and 8 weeks.

The following biocides were used: All components were aqueous based formulations:
  Octylisothiazolinone (OIT)
  Glutaraldehyde (GA)
  Sodium pyrithione (NaP)
  Benzalkonium chloride (BAC)

The following preparations were made. Amounts of antimicrobial components are given as parts per million on a weight by weight basis. The dosing position shows if the dosing of the biocide addition was before or during the shearing step e) (both according the invention) or after the shearing step (not according the invention)

TABLE 3

Preparations of stabilized MFC formulations

| Sample ID | MFC type | Biocide addition ppm | Dosing position |
|---|---|---|---|
| MFC-B-TB1 | MFC-B | 62 OIT + 1150 GA | Before |
| MFC-B-TB2 | MFC-B | 225 OIT + 460 GA | Before |
| MFC-B-TB3 | MFC-B | 185 OIT + 460 GA + 200 NaP | Before |
| MFC-B-TB4 | MFC-B | 160 OIT + 200 NaP + 2000 BAC | Before |
| MFC-A-TB1 | MFC-A | 62 OIT + 1150 GA | Before |
| MFC-C-TB1 | MFC-C | 62 OIT + 1150 GA | Before |
| MFC-D-TB1 | MFC-D | 62 OIT + 1150 GA | Before |
| MFC-E-TB1 | MFC-E | 62 OIT + 1150 GA | Before |
| MFC-B-TD1 | MFC-B | 62 OIT + 1150 GA | During |
| MFC-B-TD2 | MFC-B | 185 OIT + 460 GA + 200 NaP | During |
| MFC-B-TA1 | MFC-B | 62 OIT + 1150 GA | After |
| MFC-B-TA2 | MFC-B | 225 OIT + 460 GA | After |
| MFC-B-TA3 | MFC-B | 185 OIT + 460 GA + 200 NaP | After |
| MFC-B-TA4 | MFC-B | 160 OIT + 200 NaP + 2000 BAC | After |

The following results were obtained after the analysis for microbial activity

TABLE 4

Results of microbiological testing of stabilized MFC

| Sample ID | 1 week - bacteria | 1 week - fungi | 4 week - bacteria | 4 week - fungi | 8 week - bacteria | 8 week - fungi |
|---|---|---|---|---|---|---|
| MFC-B-TB1 | 0 | 0 | 0 | 0 | 3 | X |
| MFC-B-TB2 | 0 | 0 | 1 | X | 3 | XX |
| MFC-B-TB3 | 0 | 0 | 2 | X | 4 | XX |
| MFC-B-TB4 | 0 | 0 | 1 | 0 | 3 | X |
| MFC-A-TB1 | 0 | 0 | 1 | 0 | 3 | X |
| MFC-C-TB1 | 0 | 0 | 1 | 0 | 3 | X |
| MFC-D-TB1 | 0 | 0 | 2 | X | 4 | XX |
| MFC-E-TB1 | 0 | 0 | 1 | 0 | 3 | X |
| MFC-B-TD1 | 0 | 0 | 1 | 0 | 3 | X |
| MFC-B-TD2 | 0 | 0 | 1 | 0 | 3 | X |
| MFC-B-TA1 | 0 | 0 | 2 | X | 4 | XX |
| MFC-B-TA2 | 0 | 0 | 3 | XX | 6 | XXX |
| MFC-B-TA3 | 0 | 0 | 2 | XX | 5 | XXX |
| MFC-B-TA4 | 0 | 0 | 2 | X | 4 | XX |

As can be seen from Table 4, the addition of the biocide formulations before and during the extrusion step leads to better results than addition afterwards.

The results show that MFC can be effectively stabilized against biological degradation with the proposed formulations. Combination products (bactericide+fungicide) are more suitable than one component systems.

To see the effect in the paper making process, a dispersing and filtration test was used. The MFC material was stored for a defined time at room temperature. Then water was added to the MFC material to give a dry fiber concentration of 1% (e.g. 20 g MFC with 50% moisture content +980 g of water). This mixture was stirred for 5 min using a standard dispersing lab stirrer. Then the resulting MFC suspension was poured through a weighed sieve with a mesh size of 1 mm. 1.0 liter of MFC suspension was poured through the sieve. Then the sieve was dried at 120° C. for 30 min and the remaining MFC material on the sieve was measured by weighing the sieve after drying and determining the MFC deposited on the sieve. The result of the sieve test is then expressed as percentage of the remaining MFC on the sieve in respect to the original fiber material present in the sample (=sieve residue [%])

TABLE 5

Results of the filtration test

| Sample | Storage time | Sieve residue [%] |
| --- | --- | --- |
| MFC-B | 1 day | <0.1 |
| MFC-B | 1 week | 0.2 |
| MFC-B | 4 weeks | 2.7 |
| MFC-B | 8 weeks | 12.3 |
| MFC-B-TB1 | 1 day | <0.1 |
| MFC-B-TB1 | 1 week | <0.1 |
| MFC-B-TB1 | 4 weeks | 0.1 |
| MFC-B-TB1 | 8 weeks | 1.3 |

Table 5 shows, that the microbiological stabilization is indeed affecting the filtration results and thereby has an influence on the runnability in a paper machine.

Production of Paper

The microfibrillated cellulose composition (stabilized) was used in paper making (hand sheet).

Hand sheets containing MFC were made from recycled paper by the following procedure.

A mixture of 95% by weight of recycled linerboard and 5% MFC made from the same linerboard was suspended in water at a solids content of 4% and pulped in a laboratory pulper for 20 minutes, after which the suspension was diluted to 0.3% solids. Polyvinyl formamide with a degree of hydrolysis of 20% was added to the suspension. The metered amount for the polyvinyl formamide addition was 0.2%, based on the solids content of the paper stock suspension. Then, 1% of bentonite, based on the solids content of the paper stock suspension was added.

Sheets were formed according to the Rapid-Kothen method (ISO 5269-2) with a sheet weight of 100 g/m². The dry tensile strength (as breaking length, Tappi method T 494 (ISO 1924-2) and burst index (burst strength according to ISO 2758 divided by the grammage) were measured.

TABLE 6

Testing of the paper sheets

| Paper sample | Base material | MFC sample | MFC storage time | Tensile [m] | Burst [kPam²/g] |
| --- | --- | --- | --- | --- | --- |
| P1 | Liner board | MFC-B | 1 week | 4590 | 3.31 |
| P2 | Liner board | MFC-B | 8 weeks | 3881 | 2.67 |
| P3 | Liner board | MFC-B-TB1 | 1 week | 4578 | 3.32 |
| P4 | Liner board | MFC-B-TB1 | 8 weeks | 4467 | 3.15 |

Table 6 shows that the microbiological stabilization affects also the paper strength properties of paper made with stabilized MFC. Stabilized MFC results in paper with higher paper strength.

Samples of MFC-B were prepared in the twin-screw extruder using different biocides added before the extrusion step. Octylisothizolinone and glutaraldehyde were added in combination during the same run. The temperature of the water-cooled extruder barrel was monitored in ten zones during the extrusion process using thermoelements embedded in the metal barrel blocks. The material was passed through the extruder two times with an energy uptake of 1.1 MWh/t per pass. Samples were taken before the extruder and after each pass. The amount of remaining active biocide was measured in each sample. Table 7 shows the temperatures measured in the barrel blocks during extrusion and the amount of biocide found in the material.

TABLE 7

Thermostability of biocides

| Biocide | BAC | | OIT | | GA | | NaP | |
| --- | --- | --- | --- | --- | --- | --- | --- | --- |
| Biocide before extruder [ppm] | 970 | | 60 | | 790 | | 43 | |
| Pass | 1 | 2 | 1 | 2 | 1 | 2 | 1 | 2 |
| T2 [° C.] | 36 | 41 | 36 | 42 | 36 | 42 | 35 | 41 |
| T3 [° C.] | 37 | 41 | 36 | 42 | 36 | 42 | 32 | 41 |
| T4 [° C.] | 66 | 70 | 65 | 69 | 65 | 69 | 60 | 69 |
| T5 [° C.] | 60 | 63 | 60 | 63 | 60 | 63 | 56 | 63 |
| T6 [° C.] | 48 | 52 | 46 | 55 | 46 | 55 | 42 | 53 |
| T7 [° C.] | 48 | 52 | 48 | 54 | 48 | 54 | 43 | 68 |
| T8 [° C.] | 63 | 68 | 64 | 68 | 64 | 68 | 56 | 68 |
| T9 [° C.] | 37 | 42 | 38 | 42 | 38 | 42 | 27 | 42 |
| T10 [° C.] | 31 | 34 | 35 | 33 | 35 | 33 | 23 | 34 |
| T11 [° C.] | 26 | 30 | 27 | 30 | 27 | 30 | 21 | 31 |
| Biocide after extrusion [ppm] | 870 | 850 | 60 | 50 | 720 | 650 | 31 | 23 |
| % undegraded biocide | 90% | 88% | 100% | 83% | 91% | 82% | 72% | 53% |

It can be seen that all biocides maintain more than 50% activity after two passes. The temperature in the cooled barrel blocks reaches up to 70° C., but it may be assumed that the extruded material itself has an even higher temperature, as there is no direct contact to the thermoelements.

The invention claimed is:

1. A process for the production of a microfibrillated cellulose composition, the process comprising:
   subjecting an aqueous mixture comprising 30 to 70% by weight of cellulose containing fibers to mechanical shearing at a temperature of from 40° C. to 120° C. in the presence of at least one thermostable biocide thereby forming the microfibrillated cellulose,
   wherein the microfibrillated cellulose in the composition has an average fiber length of from 500 to 1300 µm and a percentage of a fiber in the composition having a length of 200 µm or less is at least 15%, and
   wherein the thermostable biocide is a combination of octylisothiazolinone, glutaraldehyde, and sodium pyrithione.

2. The process according to claim 1, wherein the cellulose containing fibers are bleached chemical pulp and/or wastepaper.

3. The process according to claims 1, wherein the cellulose containing fibers are mechanically sheared in a single screw, twin screw or conical extruder or with a refiner.

4. The process according to claim 1, wherein the microfibrillated cellulose has a freeness of at least 60 SR.

5. The process according to claim 1, wherein the microfibrillated cellulose has a BET surface area of from 20 to 100 m²/g.

6. The process according to claim 1, wherein the mechanical shearing is performed with an energy input of from 0.3 to 10 MWh/t of dry fiber.

7. The process according to claim 1, wherein the cellulose containing fibers, which are virgin fibers, are a starting material for the microfibrillated cellulose.

8. The process according to claim 1 wherein the octylisothiazolinone is utilized in an amount of 185 parts per million on a weight by weight basis, the glutaraldehyde is utilized in an amount of 460 parts per million on a weight by weight basis, and the sodium pyrithione is utilized in an amount of 200 parts per million on a weight by weight basis.

9. The process according to claim 8, wherein the cellulose containing fibers are derived from linerboard from recycled paper and/or old corrugated carton.

10. The process according to claim 1, wherein the cellulose containing fibers are derived from linerboard from recycled paper and/or old corrugated carton.

11. A process for the production of a microfibrillated cellulose composition, the process comprising:
subjecting an aqueous mixture comprising 30 to 70% by weight of cellulose containing fibers to mechanical shearing at a temperature of from 40° C. to 120° C. in the presence of at least one thermostable biocide thereby forming the microfibrillated cellulose,
wherein the microfibrillated cellulose in the composition has a weight-weight averaged fiber length of 800 μm determined according to Tappi standard T 271 and a percentage of a fiber in the composition having a length of 200 μm or less is about 19%, and
wherein the thermostable biocide is a combination of octylisothiazolinone, glutaraldehyde, and sodium pyrithione,
wherein the octylisothiazolinone is utilized in an amount of 185 parts per million on a weight by weight basis, the glutaraldehyde is utilized in an amount of 460 parts per million on a weight by weight basis, and the sodium pyrithione is utilized in an amount of 200 parts per million on a weight by weight basis,
wherein the thermostable biocide is added during the step of mechanical shearing, and
wherein the cellulose containing fibers are derived from linerboard from recycled paper and/or old corrugated carton.

12. The process according to claim 11 wherein the thermostable biocide is added only during the step of mechanical shearing.

* * * * *